United States Patent
Khafizov et al.

(10) Patent No.: US 6,944,175 B2
(45) Date of Patent: Sep. 13, 2005

(54) METHOD AND APPARATUS FOR SCHEDULING FORWARD LINK DATA TRANSMISSIONS IN CDMA/HDR NETWORKS

(75) Inventors: Farid Khafizov, Plano, TX (US); Geng Wu, Plano, TX (US); David Paranchych, Richardson, TX (US)

(73) Assignee: Nortel Networks Limited, St. Laurent (CA)

( * ) Notice: Subject to any disclaimer, the term of this patent is extended or adjusted under 35 U.S.C. 154(b) by 861 days.

(21) Appl. No.: 09/732,259

(22) Filed: Dec. 7, 2000

(65) Prior Publication Data

US 2002/0071446 A1 Jun. 13, 2002

(51) Int. Cl.$^7$ ................................. H04L 12/28
(52) U.S. Cl. ................ 370/431; 370/441; 370/341; 370/342; 370/338; 370/349
(58) Field of Search ................ 370/328, 329, 370/335, 342, 341, 338, 349, 431, 441, 465, 468, 470, 352–356, 331, 332, 333, 228

(56) References Cited

U.S. PATENT DOCUMENTS

| | | | | |
|---|---|---|---|---|
| 5,914,950 A | * | 6/1999 | Tiedemann et al. | 370/348 |
| 5,923,650 A | * | 7/1999 | Chen et al. | 370/331 |
| 6,493,331 B1 | * | 12/2002 | Walton et al. | 370/341 |
| 6,584,089 B1 | * | 6/2003 | Honkasalo et al. | 370/338 |
| 6,603,753 B1 | * | 8/2003 | Bedekar et al. | 370/335 |

OTHER PUBLICATIONS

CDMA/HDR: "A Bandwidth-Efficient High-Speed Wireless Data Service for Nomadic Users", by Paul Bender, Peter Black, Matthew Grob, Roberto Padovani, Nagabhushana Sindhushayana, and Andrew Viterbi, QUALCOMM, Incorporated, IEEE Communications Magazine, Jul. 2000, pp. 70–77.

* cited by examiner

*Primary Examiner*—Ajit Patel
(74) *Attorney, Agent, or Firm*—Haynes and Boone, LLP

(57) ABSTRACT

A method and apparatus for scheduling forward data link transmissions in CDMA/HDR networks. An access point that services a plurality of access terminals using corresponding forward communication links calculates a scheduling parameter for each of the corresponding forward communications links and access terminals as a function of a plurality of operating parameters.

38 Claims, 4 Drawing Sheets

US 6,944,175 B2

METHOD AND APPARATUS FOR SCHEDULING FORWARD LINK DATA TRANSMISSIONS IN CDMA/HDR NETWORKS

I. TECHNICAL FIELD

This application relates generally to communication systems and, more particularly, to a method and apparatus for scheduling data transmissions in communication networks.

II. BACKGROUND

Referring to FIGS. 1, 2a, 2b, and 3, an illustrative embodiment of a conventional code division multiple access/high data rate (CDMA/HDR) communication network 10 may include a packet data service node (PDSN) 12 that is operably coupled to the Internet 14 and a base station controller (BSC) 16 that is operably coupled to access points (APs) 18a, 18b, and 18c. Access terminals (ATs) 20a, 20b, and 20c in turn may be operably coupled to one or more of the APs 18a, 18b, and 18c.

As will be recognized by persons having ordinary skill in the art, a CDMA/HDR communication network typically utilizes a combination of time division multiple access (TDMA) and CDMA. In an illustrative embodiment, each communication channel is shared among several users, but on an as-needed basis rather than a fixed time slot as in TDMA. An example of a CDMA/HDR communications network is the wireless communication network available from Qualcomm, Inc. that, in an illustrative embodiment, provides a 2.4 Mbps data rate in a standard 1.25 MHZ CDMA bandwidth.

During operation of the network 10, in an illustrative embodiment, an active set 22 of APs may communicate with the AT 20a utilizing a wireless forward communication link 24 and a wireless reverse communication link 26. In an illustrative embodiment, at any given time period, only one of the APs in the active set 22 may communicate with the AT 20a in the forward communication link 24. By contrast, in the reverse communication link 26, the AT 20a may communicate with one or more of the APs in the active set 22.

Furthermore, during operation of the network 10, in an illustrative embodiment, in the forward communication link 24, the APs 18 may transmit a power control signal, a pilot signal, and/or a data payload to the ATs 20 using a power control channel 24a, a pilot channel 24b, and/or a data payload channel 24c, respectively. In an illustrative embodiment, the power control signal controls the power of the signals transmitted by the corresponding AT 20. Thus, in this manner, the power level of signals transmitted by a particular AT 20 is controlled by one or more of the APs 18. In an illustrative embodiment, in the reverse communication link 26, the ATs 20 may transmit data rate control signals to the APs 18 using a data rate control channel 26a. In an illustrative embodiment, the data rate control signal controls the maximum rate of data transmitted by the corresponding AP 18 to a particular AT 20 as a function of the carrier to interference ratio (C/I) for the pilot signal transmitted by the corresponding AP to the particular AT. Thus, in this manner, the maximum rate of data transmission from a particular AP 18 to a particular AT 20 is controlled as a function of the calculated C/I for the pilot signal that was transmitted from the particular AP 18 to the particular AT 20.

In a typical CDMA/HDR network, as illustrated in FIG. 3, the AP 18a may service a plurality of ATs, 20a and 20b. Conventional methods of scheduling the transmission of data from the AP 18a to the ATs, 20a and 20b, utilize a proportional fairness criteria in which a proportional fairness index is calculated for each forward communication link between the AP and the ATs. The proportional fairness index is typically calculated by dividing the peak data transmission rate by the historical average data transmission rate for some predetermined time period for each of the forward communication links between the AP 18a and the ATs, 20a and 20b. The peak data transmission rate is typically equated to the maximum data transmission rate value generated by the ATs, 20a and 20b, as a function of the calculated C/I for the forward communications link and transmitted by the ATs to the AP 18a using the data rate control signal. The AP 18a may then transmit data to the ATs, 20a and 20b, based upon the proportional fairness index values calculated for each forward communication link. Typically, the AP 18a may then schedule transmission of data within an available time slot to the AT having the highest proportional fairness index.

The scheduling of data transmission provided by using the proportional fairness criteria suffers from a number of drawbacks. For example, the proportional fairness criteria does not work very well when not enough data is in the queue to fully utilize the available physical packet layer size. This could happen, for example, when there is a low data transmission rate at the traffic origination point or a bottleneck in the network, or where the data being transmitted is the remaining small amount of a data burst.

The present invention is directed to improving the scheduling of data transmissions in the forward communication links in CDMA/HDR communication networks.

III. SUMMARY

According to one aspect of the present invention, a method of scheduling the transmission of data from an access point to a plurality of access terminals serviced by the access point using the corresponding forward communication links between the access point and the access terminals in a CDMA/HDR communications network is provided that includes the access point calculating a scheduling parameter for each of the forward communication links and access terminals as a function of a plurality of operating parameters, and the access point scheduling data for transmission to the access terminal having the largest scheduling parameter.

According to another aspect of the present invention, a communications network is provided that includes a plurality of access terminals, and an access point operably coupled to the access terminals by a plurality of corresponding forward communication links. The access point is adapted to: calculate a scheduling parameter for each of the forward communication links and access terminals as a function of a plurality of operating parameters, and schedule data for transmission to the access terminal having the largest scheduling parameter.

According to another aspect of the present invention, a computer program for scheduling the transmission of data from an access point to a plurality of access terminals serviced by the access point using the corresponding forward communication links between the access point and the access terminals in a CDMA/HDR communications network is provided that includes instructions for: the access point calculating a scheduling parameter for each of the forward communication links and access terminals as a function of a plurality of operating parameters, and the access point scheduling data for transmission to the access terminal having the largest scheduling parameter.

According to another aspect of the present invention, a communications network is provided that includes a plurality of access terminals, an access point operably coupled to the access terminals by a plurality of corresponding forward communication links, means for calculating a scheduling parameter for each of the forward communication links and access terminals as a function of a plurality of operating parameters, and means for scheduling data for transmission to the access terminal having the largest scheduling parameter.

The present embodiments of the invention provide a number of advantages. For example, the use of the frame utilization as a weighting factor in the calculation of the scheduling parameter P permits the scheduling parameter to reflect the degree to which the frame is utilized for each forward transmission link. In this manner, the scheduling of data transmissions between the access point and the access terminals is more efficient. Furthermore, the use of a plurality of weighting factors permits the calculation of the scheduling factor P to reflect the full range of relevant factors that effect and influence the scheduling of data transmission. In this manner, the scheduling of data transmissions is more efficient and more flexible.

IV. BRIEF DESCRIPTION OF THE DRAWINGS

V. DETAILED DESCRIPTION

Figure 1:
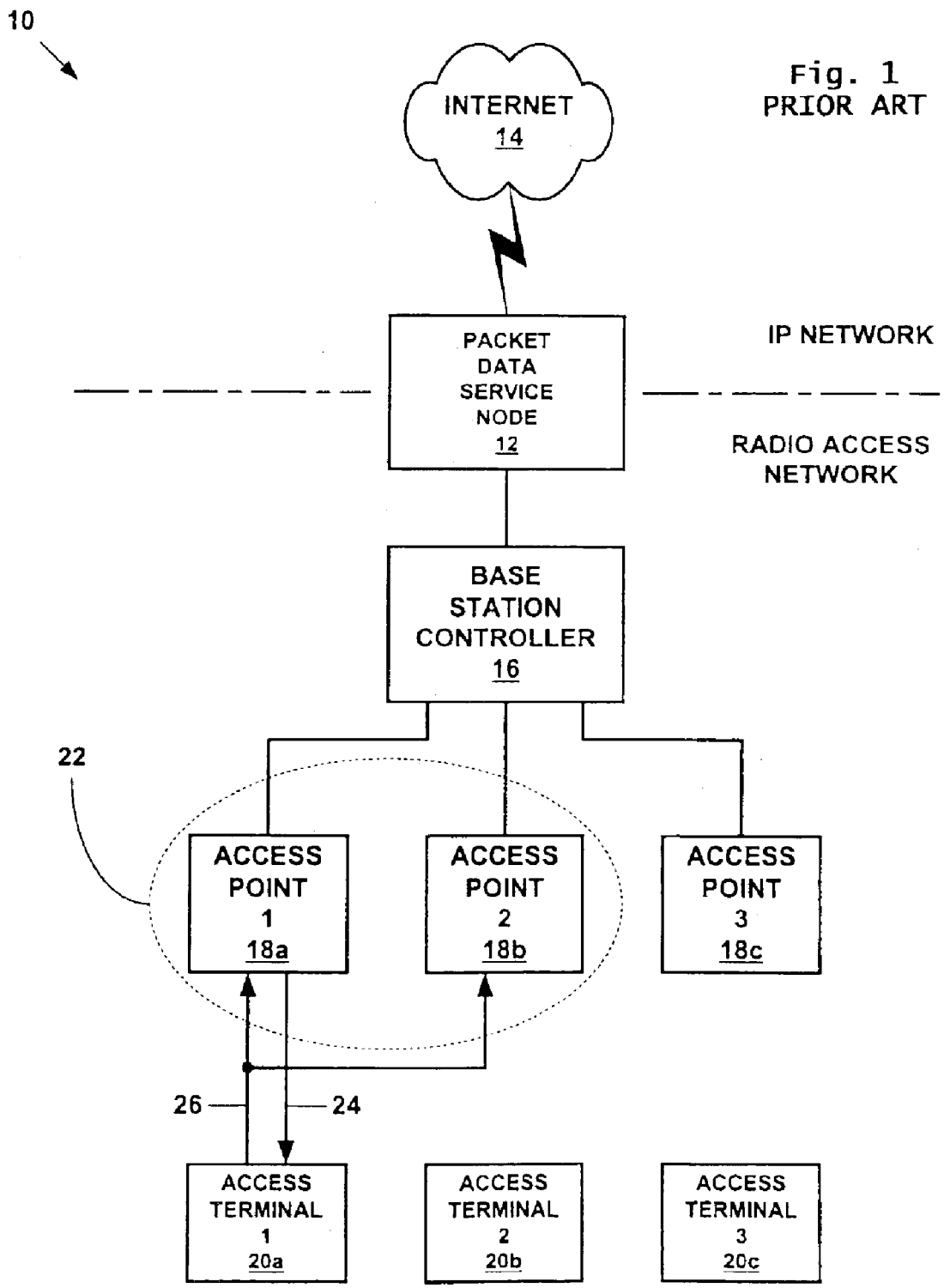
FIG. 1 is a schematic view of an illustrative embodiment of a CDMA/HDR communication network.
Figure 2A:
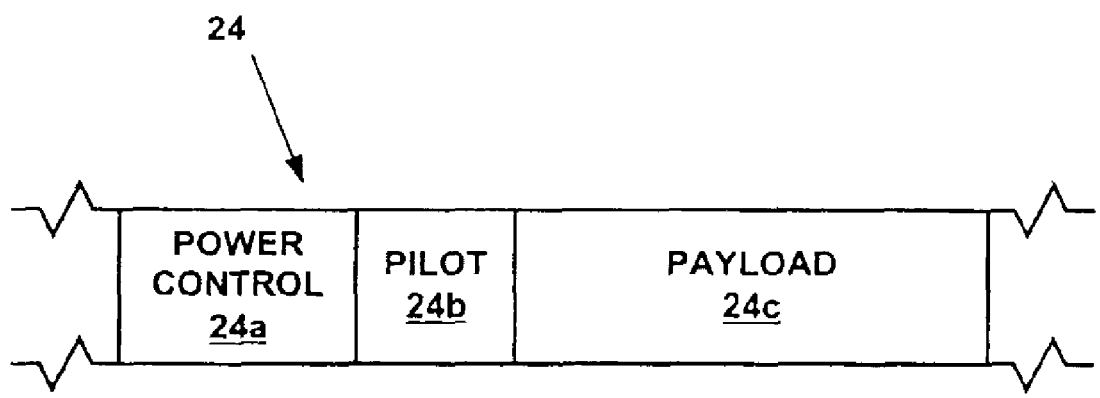
FIG. 2a is a schematic view of an illustrative embodiment of the communication during the forward communication link between the access points and access terminals of the network of FIG. 1.
Figure 2B:
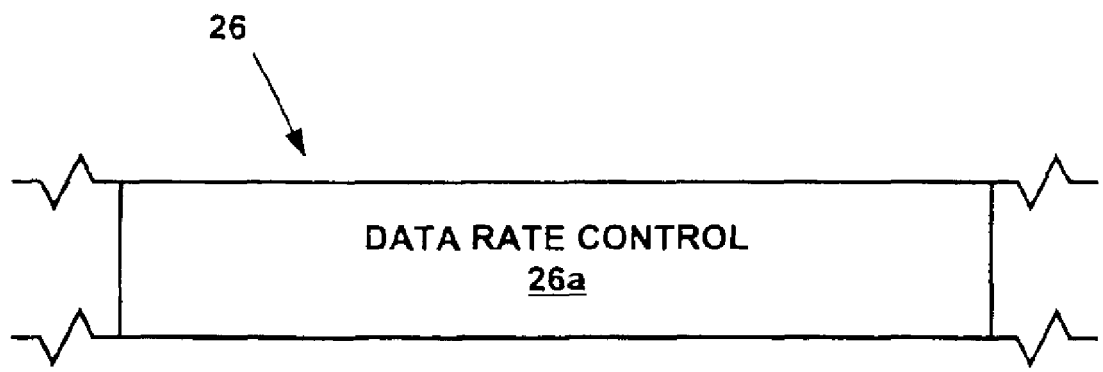
FIG. 2b is a schematic view of an illustrative embodiment of the communication during the reverse communication link between the access points and access terminals of the network of FIG. 1.
Figure 3:
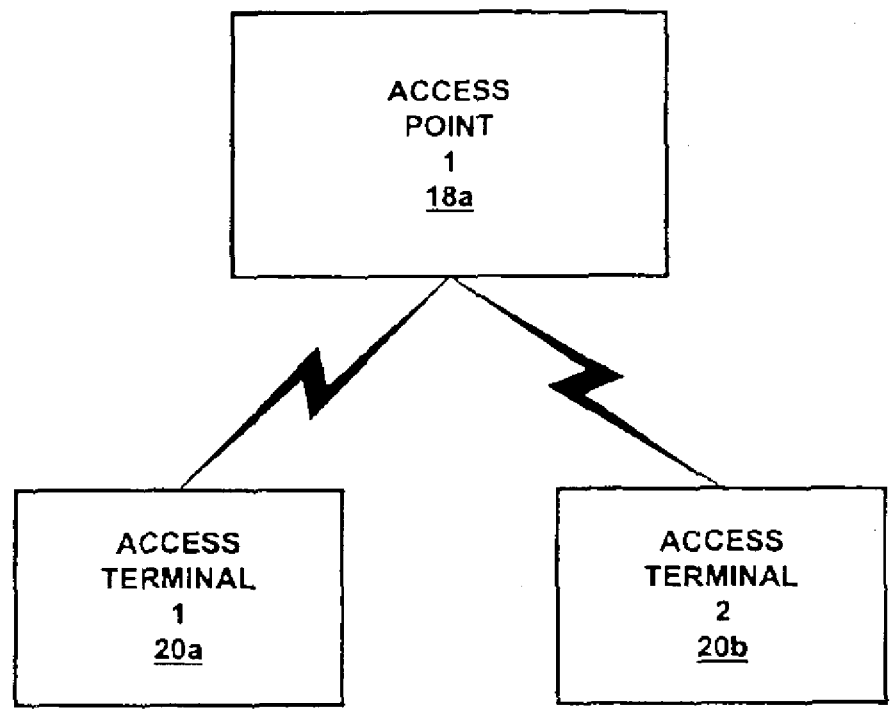
FIG. 3 is a schematic view of an illustrative embodiment of a CDMA/HDR communication network in which an access point services a plurality of access terminals.
Figure 4:
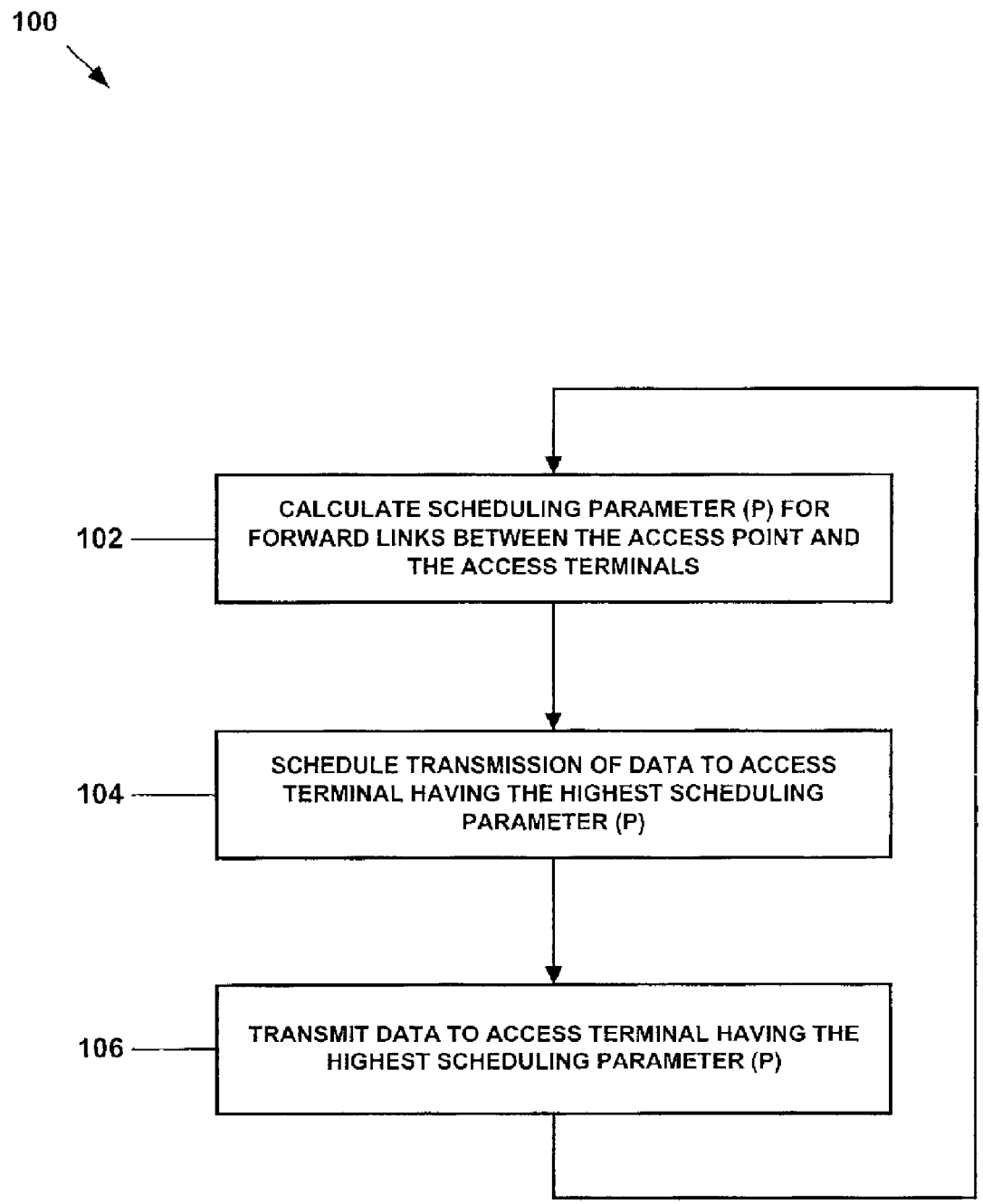
FIG. 4 is a flow chart illustration of an illustrative embodiment of a method of scheduling the transmission of data in the forward communication links between an access point and a plurality of access terminals in a CDMA/HDR network.

Referring to FIG. 4, the reference numeral 100 refers, in general to a method of scheduling the transmission of data between an access point and a plurality of access terminals in the CDMA/HDR communications network 10 in which an AP 18 servicing a plurality of ATs 20 calculates a scheduling parameter P for each of the forward links between the AP and the ATs using the following equation in step 102:

$$P_i = (R_{MAXi}/R_{AVGi}) * U_{FRAMEi} \quad (1)$$

where $P_i$ = the scheduling parameter for the ith forward communication link for the corresponding ith AT;

$R_{MAXi}$ = the maximum data transmission rate for the ith forward communication link for the corresponding ith AT;

$R_{AVGi}$ = the average data transmission rate for the ith forward communication link for the ith corresponding ith AT for a predetermined time period; and $U_{FRAMEi}$ = the frame utilization for the ith forward communication link for the corresponding ith AT.

In an exemplary embodiment, the maximum data transmission rate for the ith forward communication link $R_{MAXi}$ is substantially equal to the maximum data transmission rate transmitted to the AP 18 by the corresponding AT 20. In an exemplary embodiment, the frame utilization for the ith forward communication link $U_{FRAMEi}$ calculated using the following equation:

$$U_{FRAMEi} = DPA_i/PS_i \quad (2)$$

where $DPA_i$ = the size of the data payload available to send to the ith AT; and $PS_i$ = the physical layer packet size corresponding to $R_{MAXi}$.

The AP 18 may then schedule data for transmission to the AT having the highest scheduling parameter P in step 104. The AP 18 may then transmit a data packet to the scheduled AT 20 in step 106. The AP 18 may then repeat steps 102, 104 and 106. In this manner, the scheduling parameter P is generated using a plurality of indices. Furthermore, the use of the frame utilization $U_{FRAME}$ as a weighting factor in the generation of the scheduling parameter P ensures that the scheduling of data transmissions over the forward communication links between the AP 18 and the ATs 20 takes into account the frame utilization and thereby more efficiently schedules the transmission of data.

More generally, the scheduling parameter P may be calculated using the following equation:

$$P_i = (R_{MAXi}/R_{AVGi}) * WF_1 * WF_2 * \ldots * WF_j \quad (3)$$

where $P_i$ = the scheduling parameter for the ith forward communication link for the corresponding ith AT;

$R_{MAXi}$ = the maximum data transmission rate for the ith forward communication link for the corresponding ith AT;

$R_{AVGi}$ = the average data transmission rate for the ith forward communication link for the corresponding ith AT for a predetermined time period; and $WF_1 \ldots WF_j$ = weighting factors to be used to generate the scheduling parameter P, where j varies from 1 to N.

In an exemplary embodiment, the weighting factors may include one or more of the following: the frame utilization $U_{FRAMEi}$, and the priority of the data to be sent using the ith forward communication link $Priority_i$. In an exemplary embodiment, all of the weighting factors $WF_j$ are expressed as a fraction that can vary from zero to one. In a further exemplary embodiment, one or more of the weight factors $WF_j$ are also normalized.

The present embodiments of the invention provide a number of advantages. For example, the use of the frame utilization as a weighting factor in the calculation of the scheduling parameter P permits the scheduling parameter to reflect the degree to which the frame is utilized for each forward transmission link. In this manner, the scheduling of data transmissions between the access point and the access terminals is more efficient. Furthermore, the use of a plurality of weighting factors permits the calculation of the scheduling factor P to reflect to full range of relevant factors that effect and influence the scheduling of data transmission. In this manner, the scheduling of data transmissions is more efficient and more flexible.

It is understood that variations may be made in the foregoing without departing from the scope of the present invention. For example, additional weighting factors could also be used in addition to, or instead, of the weighting factors of the present disclosure in order to further refine the calculation of the scheduling parameter P. Furthermore, the calculation of the scheduling parameters and/or the actual scheduling decision may be implemented by the access point and/or other functional elements of the communications network such as, for example, the base station controller 16. Finally, the calculation of the calculation of the scheduling parameters and/or the actual scheduling decision may be implemented by one or more scheduling controllers distributed throughout the communications network.

It is understood that other modifications, changes and substitutions are intended in the foregoing disclosure and in some instances some features of the disclosure will be employed without corresponding use of other features. Accordingly, it is appropriate that the appended claims be construed broadly and in a manner consistent with the scope of the disclosure.

What is claimed is:

1. A method of scheduling the transmission of data from an access point to a plurality of access terminals serviced by the access point using the corresponding forward communication links between the access point and the access terminals in a CDMA/HDR communications network, comprising:

the access point calculating a scheduling parameter for each of the forward communication links and access terminals as a function of a plurality of operating parameters; and the access point scheduling data for transmission to the access terminal having the largest scheduling parameter;

wherein the access point calculates the scheduling parameter for each of the forward communication links and access terminals as a function of a frame utilization for the corresponding forward communication link and access terminal.

2. The method of claim 1, wherein the frame utilization is calculated as a function of a size of a data payload available to send to the corresponding access terminal and a size of the physical layer packet for the corresponding access terminal.

3. The method of claim 1, wherein the access point calculates the frame utilization $U_{FRAMEi}$ for the ith forward communication link and access terminal using the following expression:

$$U_{FRAMEi}=DPA_i/PS_i;$$

wherein $DPA_i$=the size of the data payload available to send to the ith access terminal; and $PS_i$=the physical layer packet size corresponding to a maximum data transmission rate for the ith access terminal.

4. The method of claim 1, wherein the access point calculates the scheduling parameter for each of the forward communication links and access terminals as a function of the frame utilization, a maximum data transmission rate, and an average data transmission rate for the corresponding forward communication link and access terminal.

5. The method of claim 4, wherein the frame utilization is calculated as a function of a size of a data payload available to send to the corresponding access terminal and a size of the physical layer packet for the corresponding access terminal.

6. The method of claim 4, wherein the access point calculates the frame utilization $U_{FRAMEi}$ for the ith forward communication link and access terminal using the following expression:

$$U_{FRAMEi}=DPA_i/PS_i;$$

wherein $DPA_i$=the size of the data payload available to send to the ith access terminal; and $PS_i$=the physical layer packet size corresponding to a maximum data transmission rate for the ith access terminal.

7. A method of scheduling the transmission of data from an access point to a plurality of access terminals serviced by the access point using the corresponding forward communication links between the access point and the access terminals in a CDMA/HDR communications network comprising:

the access point calculating a scheduling parameter for each of the forward communication links and access terminals as a function of a plurality of operating parameters; and the access point scheduling data for transmission to the access terminal having the largest scheduling parameter;

wherein the access point calculates the scheduling parameter for each of the forward communication links and access terminals as a function of one or more weighting factors, a maximum data transmission rate, and an average data transmission rate for the corresponding forward communication link and access terminal.

8. The method of claim 7, wherein the weighting factors are selected from the group consisting of:

a frame utilization for the corresponding forward communication link and access terminal; and a priority of the data to be transmitted to the corresponding access terminal.

9. A method of scheduling the transmission of data from an access point to a plurality of access terminals serviced by the access point using the corresponding forward communication links between the access point and the access terminals in a CDMA/HDR communications network, comprising:

the access point calculating a scheduling parameter for each of the forward communication links and access terminals as a function of a plurality of operating parameters; and the access point scheduling data for transmission to the access terminal having the largest scheduling parameter;

wherein the access point calculates the scheduling parameter for each of the forward communication links and access terminals as a function of a priority of the data to be sent to the corresponding access terminal.

10. The method of claim 1, wherein the access point calculates the scheduling parameter $P_i$ for an ith access terminal and forward communication link using the following expression:

$$P_i=(R_{MAXi}/R_{AVGi})*U_{FRAMEi};$$

wherein $P_i$=the scheduling parameter for the ith forward communication link for the corresponding ith access terminal;

$R_{MAXi}$=the maximum data transmission rate for the ith forward communication link for the corresponding ith access terminal;

$R_{AVGi}$=the average data transmission rate for the ith forward communication link for the ith corresponding ith access terminal for a predetermined time period; and $U_{FRAMEi}$=the frame utilization for the ith forward communication link for the corresponding ith access terminal.

11. The method of claim 10, wherein the access point calculates the frame utilization $U_{FRAMEi}$ for the ith forward communication link and access terminal using the following expression:

$$U_{FRAMEi}=DPA_i/PS_i;$$

wherein
$DPA_i$=the size of the data payload available to send to the ith access terminal; and
$PS_i$=the physical layer packet size corresponding to $R_{MAXi}$.

12. A communications network, comprising:
a plurality of access terminals; and
an access point operably coupled to the access terminals by a plurality of corresponding forward communication links;
wherein the access point is adapted to calculate a scheduling parameter for each of the forward communication links and access terminals as a function of a plurality of operating parameters; and
wherein the access point is adapted to schedule data for transmission to the access terminal having the largest scheduling parameter;
wherein the access point is adapted to calculate the scheduling parameter for each of the forward communication links and access terminals as a function of a frame utilization for the corresponding forward communication link and access terminal.

13. The communications network of claim 12, wherein the frame utilization is calculated as a function of a size of a data payload available to send to the corresponding access terminal and a size of the physical layer packet for the corresponding access terminal.

14. The communications network of claim 12, wherein the access point is adapted to calculate the frame utilization $U_{FRAMEi}$ for the ith forward communication link and access terminal using the following expression:

$$U_{FRAMEi}=DPA_i/PS_i;$$

wherein
$DPA_i$=the size of the data payload available to send to the ith access terminal; and
$PS_i$=the physical layer packet size corresponding to a maximum data transmission rate for the ith access terminal.

15. The communications network of claim 12, wherein the access point is adapted to calculate the scheduling parameter for each of the forward communication links and access terminals as a function of the frame utilization, a maximum data transmission rate, and an average data transmission rate for the corresponding forward communication link and access terminal.

16. The communications network of claim 15, wherein the frame utilization is calculated as a function of a size of a data payload available to send to the corresponding access terminal and a size of the physical layer packet for the corresponding access terminal.

17. The communications network of claim 15, wherein the access point is adapted to calculate the frame utilization $U_{FRAMEi}$ for the ith forward communication link and access terminal using the following expression:

$$U_{FRAMEi}=DPA_i/PS_i;$$

wherein
$DPA_i$=the size of the data payload available to send to the ith access terminal; and
$PS_i$=the physical layer packet size corresponding to a maximum data transmission rate for the ith access terminal.

18. A communications network, comprising:
a plurality of access terminals; and
an access point operably coupled to the access terminals by a plurality of corresponding forward communication links;
wherein the access point is adapted to calculate a scheduling parameter for each of the forward communication links and access terminals as a function of a plurality of operating parameters; and
wherein the access point is adapted to schedule data for transmission to the access terminal having the largest scheduling parameter;
wherein the access point is adapted to calculate the scheduling parameter for each of the forward communication links and access terminals as a function of one or more weighting factors, a maximum data transmission rate, and an average data transmission rate for the corresponding forward communication link and access terminal.

19. The communications network of claim 18, wherein the weighting factors are selected from the group consisting of:
a frame utilization for the corresponding forward communication link and access terminal; and
a priority of the data to be transmitted to the corresponding access terminal.

20. A communications network, comprising:
a plurality of access terminals; and
an access point operably coupled to the access terminals by a plurality of corresponding forward communication links;
wherein the access point is adapted to calculate a scheduling parameter for each of the forward communication links and access terminals as a function of a plurality of operating parameters; and
wherein the access point is adapted to schedule data for transmission to the access terminal having the largest scheduling parameter;
wherein the access point is adapted to calculate the scheduling parameter for each of the forward communication links and access terminals as a function of a priority of the data to be sent to the corresponding access terminal.

21. The communications network of claim 12, wherein the access point is adapted to calculate a scheduling parameter $P_i$ for an ith access terminal and forward communication link using the following expression:

$$P_i=(R_{MAXi}/R_{AVGi})*U_{FRAMEi};$$

wherein
$P_i$=the scheduling parameter for the ith forward communication link for the corresponding ith access terminal;
$R_{MAXi}$=the maximum data transmission rate for the ith forward communication link for the corresponding ith access terminal;
$R_{AVGi}$=the average data transmission rate for the ith forward communication link for the ith corresponding ith access terminal for a predetermined time period; and $U_{FRAMEi}$=the frame utilization for the ith forward communication link for the corresponding ith access terminal.

22. The communications network of claim 21, wherein the access point is adapted to calculate the frame utilization $U_{FRAMEi}$ for the ith forward communication link and access terminal using the following expression:

$$U_{FRAMEi}=DPA_i/PS_i;$$

wherein $DPA_i$=the size of the data payload available to send to the ith access terminal; and $PS_i$=the physical layer packet size corresponding to $R_{MAXi}$.

23. A computer program for scheduling the transmission of data from an access point to a plurality of access terminals serviced by the access point using the corresponding forward communication links between the access point and the access terminals in a CDMA/HDR communications network, comprising instructions for:

the access point calculating a scheduling parameter for each of the forward communication links and access terminals as a function of a plurality of operating parameters; and the access point scheduling data for transmission to the access terminal having the largest scheduling parameter;

wherein the access point calculates the scheduling parameter for each of the forward communication links and access terminals as a function of a frame utilization for the corresponding forward communication link and access terminal.

24. The computer program of claim 23, wherein the frame utilization is calculated as a function of a size of a data payload available to send to the corresponding access terminal and a size of the physical layer packet for the corresponding access terminal.

25. The computer program of claim 23, wherein the access point calculates the frame utilization $U_{FRAMEi}$ for the ith forward communication link and access terminal using the following expression:

$$U_{FRAMEi}=DPA_i/PS_i;$$

wherein $DPA_i$=the size of the data payload available to send to the ith access terminal; and $PS_i$=the physical layer packet size corresponding to a maximum data transmission rate for the ith access terminal.

26. The computer program of claim 23, wherein the access point calculates the scheduling parameter for each of the forward communication links and access terminals as a function of the frame utilization, a maximum data transmission rate, and an average data transmission rate for the corresponding forward communication link and access terminal.

27. The computer program of claim 26, wherein the frame utilization is calculated as a function of a size of a data payload available to send to the corresponding access terminal and a size of the physical layer packet for the corresponding access terminal.

28. The computer program of claim 26, wherein the access point calculates the frame utilization $U_{FRAMEi}$ for the ith forward communication link and access terminal using the following expression:

$$U_{FRAMEi}=DPA_i/PS_i;$$

wherein $DPA_i$=the size of the data payload available to send to the ith access terminal; and $PS_i$=the physical layer packet size corresponding to a maximum data transmission rate for the ith access terminal.

29. The computer program of claim 23, wherein the access point calculates a scheduling parameter $P_i$ for an ith access terminal and forward communication link using the following expression:

$$P_i=(R_{MAXi}/R_{AVGi})*U_{FRAMEi};$$

wherein $P_i$=the scheduling parameter for the ith forward communication link for the corresponding ith access terminal;

$R_{MAXi}$=the maximum data transmission rate for the ith forward communication link for the corresponding ith access terminal;

$R_{AVGi}$=the average data transmission rate for the ith forward communication link for the ith corresponding ith access terminal for a predetermined time period; and $U_{FRAMEi}$=the frame utilization for the ith forward communication link for the corresponding ith access terminal.

30. The computer program of claim 29, wherein the access point calculates the frame utilization $U_{FRAMEi}$ for the ith forward communication link and access terminal using the following expression:

$$U_{FRAMEi}=DPA_i/PS_i;$$

wherein $DPA_i$=the size of the data payload available to send to the ith access terminal; and $PS_i$=the physical layer packet size corresponding to $R_{MAXi}$.

31. A communications network, comprising:

a plurality of access terminals;

an access point operably coupled to the access terminals by a plurality of corresponding forward communication links;

means for calculating a scheduling parameter for each of the forward communication links and access terminals as a function of a plurality of operating parameters;

means for scheduling data for transmission to the access terminal having the largest scheduling parameter; and means for calculating the scheduling parameter for each of the forward communication links and access terminals as a function of a frame utilization for the corresponding forward communication link and access terminal.

32. The communications network of claim 31, further comprising:

means for calculating the frame utilization as a function of a size of a data payload available to send to the corresponding access terminal and a size of the physical layer packet for the corresponding access terminal.

33. The communications network of claim 31, further comprising:

means for calculating the frame utilization $U_{FRAMEi}$ for the ith forward communication link and access terminal using the following expression:

$$U_{FRAMEi}=DPA_i/PS_i;$$

wherein
- $DPA_i$=the size of the data payload available to send to the ith access terminal; and
- $PS_i$=the physical layer packet size corresponding to a maximum data transmission rate for the ith access terminal.

34. The communications network of claim 31, further comprising:
   means for calculating the scheduling parameter for each of the forward communication links and access terminals as a function of the frame utilization, a maximum data transmission rate, and an average data transmission rate for the corresponding forward communication link and access terminal.

35. The communications network of claim 34, further comprising:
   means for calculating the frame utilization as a function of a size of a data payload available to send to the corresponding access terminal and a size of the physical layer packet for the corresponding access terminal.

36. The communications network of claim 34, further comprising:
   means for calculating the frame utilization $U_{FRAMEi}$ for the ith forward communication link and access terminal using the following expression:

$$U_{FRAMEi}=DPA_i/PS_i;$$

wherein
- $DPA_i$=the size of the data payload available to send to the ith access terminal; and
- $PS_i$=the physical layer packet size corresponding to a maximum data transmission rate for the ith access terminal.

37. The communications network of claim 31, further comprising: means for calculating the scheduling parameter $P_i$ for an ith access terminal and forward communication link using the following expression:

$$P_i=(R_{MAXi}/R_{AVGi})*U_{FRAMEi};$$

wherein
- $P_i$=the scheduling parameter for the ith forward communication link for the corresponding ith access terminal;
- $R_{MAXi}$=the maximum data transmission rate for the ith forward communication link for the corresponding ith access terminal;
- $R_{AVGi}$=the average data transmission rate for the ith forward communication link for the ith corresponding ith access terminal for a predetermined time period; and
- $U_{FRAMEi}$=the frame utilization for the ith forward communication link for the corresponding ith access terminal.

38. The communications network of claim 37, further comprising:
   means for calculating the frame utilization $U_{FRAMEi}$ for the ith forward communication link and access terminal using the following expression:

$$U_{FRAMEi}=DPA_i/PS_i;$$

wherein
- $DPA_i$=the size of the data payload available to send to the ith access terminal; and
- $PS_i$=the physical layer packet size corresponding to $R_{MAXi}$.

* * * * *